US011301356B2

(12) United States Patent
Plotnik et al.

(10) Patent No.: US 11,301,356 B2
(45) Date of Patent: Apr. 12, 2022

(54) SYSTEM, METHOD, AND PROCESS FOR CONTINUOUSLY IDENTIFYING MATERIAL CHANGES AND CALCULATING RISK FOR APPLICATIONS AND INFRASTRUCTURE

(71) Applicant: APIIRO LTD., Tel Aviv (IL)

(72) Inventors: Idan Plotnik, Herzliya (IL); Yonatan Eldar, Tel Aviv (IL)

(73) Assignee: APIIRO LTD., Tel Aviv (IL)

( * ) Notice: Subject to any disclaimer, the term of this patent is extended or adjusted under 35 U.S.C. 154(b) by 70 days.

(21) Appl. No.: 16/884,116

(22) Filed: May 27, 2020

(65) Prior Publication Data

US 2020/0379879 A1 Dec. 3, 2020

Related U.S. Application Data

(60) Provisional application No. 62/853,201, filed on May 28, 2019.

(51) Int. Cl.
| | |
|---|---|
| *G06F 11/36* | (2006.01) |
| *G06F 8/71* | (2018.01) |
| *G06F 8/41* | (2018.01) |
| *G06F 11/34* | (2006.01) |
| *G06F 21/57* | (2013.01) |
| *G06N 20/00* | (2019.01) |
| *B62H 1/02* | (2006.01) |
| *B62H 5/14* | (2006.01) |

(52) U.S. Cl.
CPC .......... *G06F 11/3604* (2013.01); *B62H 1/02* (2013.01); *B62H 5/142* (2013.01); *G06F 8/433* (2013.01); *G06F 8/71* (2013.01); *G06F 11/3438* (2013.01); *G06F 21/577* (2013.01); *G06N 20/00* (2019.01)

(58) Field of Classification Search
CPC ........ G06F 8/433; G06F 8/71; G06F 11/3604; G06F 11/3438; G06F 21/577; B62H 1/02; B62H 5/142; G06N 20/00
See application file for complete search history.

(56) References Cited

U.S. PATENT DOCUMENTS

| | | | | |
|---|---|---|---|---|
| 7,779,480 | B2* | 8/2010 | Verbowski | G06F 21/6218 726/26 |
| 9,075,773 | B1* | 7/2015 | Rakitzis | G06F 11/2069 |
| 9,104,997 | B1* | 8/2015 | Balasubramanian | G06Q 10/06 |
| 9,626,283 | B1* | 4/2017 | Zlatnik | G06Q 10/06 |
| 9,652,225 | B1* | 5/2017 | Bohn | G06F 8/30 |
| 10,175,979 | B1* | 1/2019 | Elwell | G06F 8/71 |
| 2004/0205726 | A1* | 10/2004 | Chedgey | G06F 8/75 717/125 |

(Continued)

*Primary Examiner* — Douglas M Slachta
(74) *Attorney, Agent, or Firm* — Mark M. Friedman (57) ABSTRACT

A method and system for risk assessment of an application or infrastructure, includes: Code Intelligence Analyzers that scan historic code commits in code repositories of the application or infrastructure as well as real-time code commits; a Developer Behavior Profiler builds a behavior profile for each developer of the application, based, at least on the historic and real-time code commits and relevant issues in Issue Tracking Systems; and a Spacetime Graph, being a multidimensional graph detailing a current state of the application or infrastructure and a history of the code commits of the application or infrastructure, as determined by the Code Intelligence Analyzers and the Developer Behavior Profiler.

16 Claims, 4 Drawing Sheets

(56) References Cited

U.S. PATENT DOCUMENTS

| | | | | |
|---|---|---|---|---|
| 2006/0123389 A1* | 6/2006 | Kolawa | ............... | G06F 11/3616 |
| | | | | 717/101 |
| 2009/0133006 A1* | 5/2009 | Cheung | .................... | G06F 8/71 |
| | | | | 717/144 |
| 2014/0114980 A1* | 4/2014 | Mani | .................... | G06F 16/313 |
| | | | | 707/741 |
| 2014/0165027 A1* | 6/2014 | Herbert | .......... | G06Q 10/063112 |
| | | | | 717/101 |
| 2016/0004517 A1* | 1/2016 | Safary | ................... | G06F 11/366 |
| | | | | 717/131 |
| 2016/0224908 A1* | 8/2016 | Jagannathan | ........ | G06Q 10/063 |
| 2017/0123790 A1* | 5/2017 | Gupta | ................ | G06F 11/3604 |
| 2018/0349614 A1* | 12/2018 | Ionescu | ................ | G06F 21/577 |
| 2019/0347095 A1* | 11/2019 | Adams | ...................... | G06F 8/60 |
| 2019/0347424 A1* | 11/2019 | Bezzi | .................... | G06F 21/577 |

\* cited by examiner

FIG. 1

| Review Type / Material Code Changes | Leadership Review (Engineering Group Leader) Review Artifacts: Requirements, High level design | Architecture Review (Architect + DevOps + Product) Review Artifacts: Design, Data flow, Sequence diagram | Security Review (Architect) Review Artifacts: Threat Model | Compliance Review (Architect) Review Artifacts: Data flow, Privacy questionnaire | Penetration Testing (pen-tester) Review Artifacts: Questionnaire, code changes, AP list etc. | Vulnerability Scanning (DevSecOps) Review Artifacts: Source code |
|---|---|---|---|---|---|---|
| Completely new scenario (e.g. uploading files from customers network to cloud for analysis) | X | X | X | X | X | X |
| Major functionality addition (e.g. | | X | X | X | X | X |
| Usage of new technology (e.g. New DB. | | X | X | X | | |
| Collecting / Storing new data type | | | | X | X | |
| Sharing data with a new partner | | | X | X | X | |
| Data flow changes | | | | X | | |
| Usage of new programming languages | | X | | | | |
| Usage of OSS that was privately changed | | | X | | | |

PRIOR ART

SYSTEM, METHOD, AND PROCESS FOR CONTINUOUSLY IDENTIFYING MATERIAL CHANGES AND CALCULATING RISK FOR APPLICATIONS AND INFRASTRUCTURE

This patent application claims priority from, and the benefit of, U.S. Provisional Patent Application No. 62/853,201, filed May 28, 2019, which is incorporated in its entirety as if fully set forth herein.

FIELD OF THE INVENTION

The present invention relates to digital transformation and, more particularly, to streamlining the application and infrastructure risk assessment process by identifying material changes and continuously assuring implementation of security and compliance controls as part of Secure by Design (SbD) and CI/CD (Continuous Integration/Continuous Delivery) practices.

BACKGROUND OF THE INVENTION

Digital transformation is the process of using new technologies to create new or modify existing business, culture, and customer experiences to meet changing business and market requirements.

In today's world, digital transformation is essential to business growth and in its wake has created extensive software development and DevOps efforts across all industries. One of the most important changes in the digital transformation area is the understanding (at the board of directors level) that the software developers cannot keep releasing software (updates, patches, add-ons, versions) every 3-6 months, but rather software must be released faster than ever to be able to innovate, grow the business and keep up with competitors.

For that purpose, an important shift in the high-tech industry occurred, moving from 'waterfall' to 'agile' methodology and adopting CI/CD (Continuous Integration/Continuous Delivery) to allow faster delivery of the code to production.

In addition, the industry moved to a "Shift Left" mindset. Shift Left is an approach for software testing, in which testing is performed earlier in the lifecycle (i.e., moved left on the project timeline) and is becoming an integral part in the CI/CD pipeline.

An important key to faster delivery and scaling a business is the cloud. In the cloud-first world, the cloud vendors are responsible for the security of the cloud (compute, storage, database, and networking) while customers are responsible for the security in the cloud (application security and compliance, identity management, etc.).

As part of every new development or a material software change (e.g. new API, changing data model etc.), the organization must execute architecture, security, and compliance reviews (i.e. to assess the risk of implementing the new change).

Figure 1:
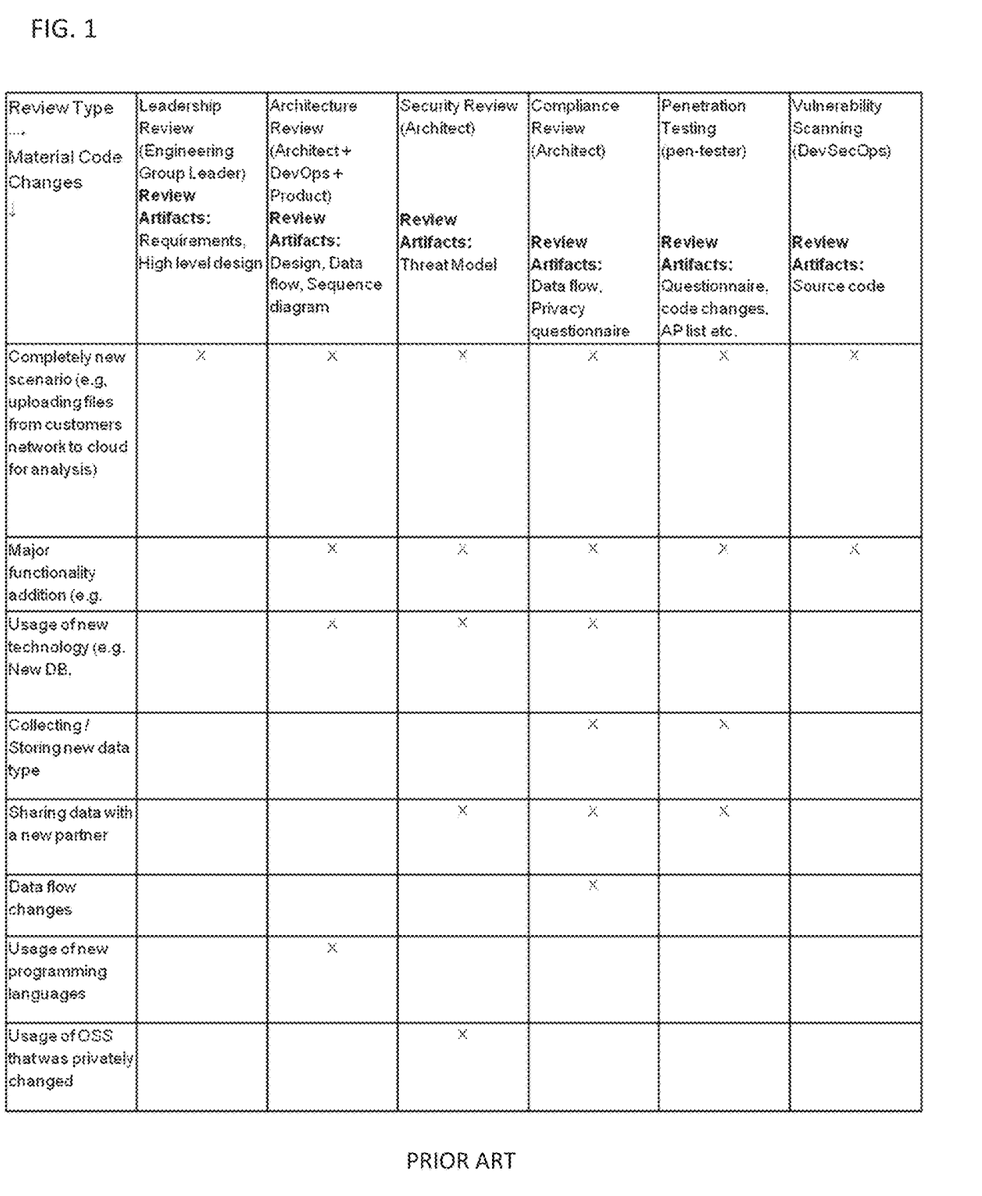
FIG. 1 is a Table of a prior art example of the Secure by Design (SbD) best practices.

FIG. 1 is a Table of a prior art example of the Secure by Design (SbD) best practices, but every organization chooses to implement it in a different way. In the old waterfall model, when software releases were in a 3-6 months period, DevSecOps/security architects used to handle all the changes, and manage the risk.

In CI/CD, there is no Waterfall handoff of design specifications to developers and there may not be any design specifications at all that can be reviewed as part of the application risk assessment.

When there is minimal design work being done—"the code is the design". In this case, one of the problems to be solved is where and how to catch security and compliance problems in every material change (application and infrastructure).

Having said that, with every exponential progress come great challenges. Current Secure by Design (SbD) tools and processes are manual and time-consuming so they slow down progress. In addition, these tools and processes are inefficient because they occur on a one-time or semi-annual basis, such that the high number of material changes in CI/CD, creates major security and compliance gaps, which increase the risk to the application.

In enterprise organizations, as reflected by the table in FIG. 1, the developer or the product manager are the catalysts, and they need to manually approach the DevSecOps/security architect and tell them about the material changes the developers are planning to, or are already working on, and in a worst case scenario, have already committed, so that the DevSecOps/security architect will know to start the architecture, security and compliance reviews accordingly.

To perform the reviews, the DevSecOps/architect needs to collect the data from the developers and product managers, to know which components to focus on. This process consumes a lot of time from the developers and product managers and is the antithesis of the CI/CD and Shift Left mindset.

SUMMARY OF THE INVENTION

The present invention is aimed, in part, at continuously identifying material changes and prioritizing the risk based on missing or improper implementations of security/compliance controls and developer behavior.

As a result, the application risk assessment process will be streamlined, and the developers' time that DevSecOps/security architects waste will be reduced such that organizations will be able to release code more often, and move their applications to the cloud in a fast and secure manner.

In addition, another aim of the instant innovative process is to aggregate the results into a contextual security view and provide a unified risk score for all applications in the organization.

According to the present invention there is provided system for risk assessment of an application or infrastructure, includes: Code Intelligence Analyzers that scan historic code commits in code repositories of the application or infrastructure as well as real-time code commits; a Developer Behavior Profiler builds a behavior profile for each developer of the application, based, at least on the historic and real-time code commits and relevant issues in Issue Tracking Systems; and a Spacetime Graph, being a multi-dimensional graph detailing a current state of the application or infrastructure and a history of the code commits of the application or infrastructure, as determined by the Code Intelligence Analyzers and the Developer Behavior Profiler.

According to further features in preferred embodiments of the invention described below the system further includes: Material Changes Detectors configured to detect material changes in the historic and real-time code commits of the application or infrastructure using AI or machine learning and the behavior profiles to identify the material changes that might affect security of the application or infrastructure.

According to still further features in the described preferred embodiments the system further includes: a Risk Engine configured to calculate a risk for each of the material changes, the risk calculated based on identification of at least one of Technical, Behavioral and Process-related risk factors.

According to still further features the system further includes: a Prioritization Engine configured to prioritize for use by a security architect, the material changes based on the calculated risk.

According to still further features the system further includes: an Adaptive Code Governance Engine configured to issue a Governance rule including adaptive code governance rules that dictate which detected changes are the material changes, and what the risk is attributed to the material changes.

According to still further features the system further includes: a Risk-Based Workflow Engine configured to trigger a specific workflow as a result of the adaptive code governance rule being issued, the specific workflow includes at least one of creating a ticket in an external issue-tracking system and suggesting a code change in a Source Control System.

According to still further features the spacetime graph is multidimensional and includes at least: (a) a Contextual Code Patterns dimension, including insights as to patterns, commonalities and similarities within the repository and between the repository and other repositories resulting from AI or Machine Learning analysis of the code commits and assembly of a control-flow graph for at least the code repository, (b) a Security and Compliance Controls dimension, including contextually identified security and compliance controls, (c) a Developer Behavior Analysis dimension, including the behavior profiles of the developers, and (d) a Material Changes dimension including changes that might affect the application or infrastructure.

According to still further features the spacetime graph also describes all historical states of the application or infrastructure. According to still further features the Contextual Code Patterns dimension further includes a control-flow graph across multiple source control systems.

According to another embodiment there is provided a method for risk assessment of an application or infrastructure, including: scanning historic code commits in code repositories of the application or infrastructure as well as real-time code commits using Code Intelligence Analyzers; building behavior profiles for each developer based on at least the scanning of the historic and real-time code commits; and generating a spacetime graph detailing a current state of the application or infrastructure and a history of the code commits of the application or infrastructure based on the scanning and the behavior profiles.

According to further features the method further includes: detecting material changes in the historic and real-time code commits of the application or infrastructure using AI or machine learning and the behavior profiles to identify the material changes that might affect security and compliance posture of the application or infrastructure.

According to still further features the method further includes: calculating a risk for each of the material changes, the risk calculated based on identification of at least one of Technical, Behavioral and Process-related risk factors.

According to still further features the method further includes: prioritizing, for use by a security architect, the material changes based on the calculated risk.

According to still further features The method further includes: issuing a Governance rule including adaptive code governance rules that dictate which detected changes are the material changes, and what the risk is attributed to the material changes.

According to still further features the method further includes triggering a specific workflow as a result of the adaptive code governance rule being issued, the specific workflow includes at least one of creating a ticket in an external issue-tracking system and suggesting a code change in a Source Control System.

According to still further features the spacetime graph is multidimensional and includes at least: (a) a Contextual Code Patterns dimension, including insights as to patterns, commonalities and similarities within the repository and between the repository and other repositories resulting from AI or Machine Learning analysis of the code commits and assembly of a control-flow graph for at least the code repository, (b) a Security and Compliance Controls dimension, including contextually identified security and compliance controls, (c) a Developer Behavior Analysis dimension, including the behavior profiles of the developers, and (d) a Material Changes dimension including changes that might affect the application or infrastructure.

According to still further features the spacetime graph also describes all historical states of the application or infrastructure.

According to still further features the Contextual Code Patterns dimension further includes a control-flow graph across multiple source control systems.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a system, method, and process for continuously identifying material changes and calculating risk according to the present invention may be better understood with reference to the drawings and the accompanying description.

Figure 2:
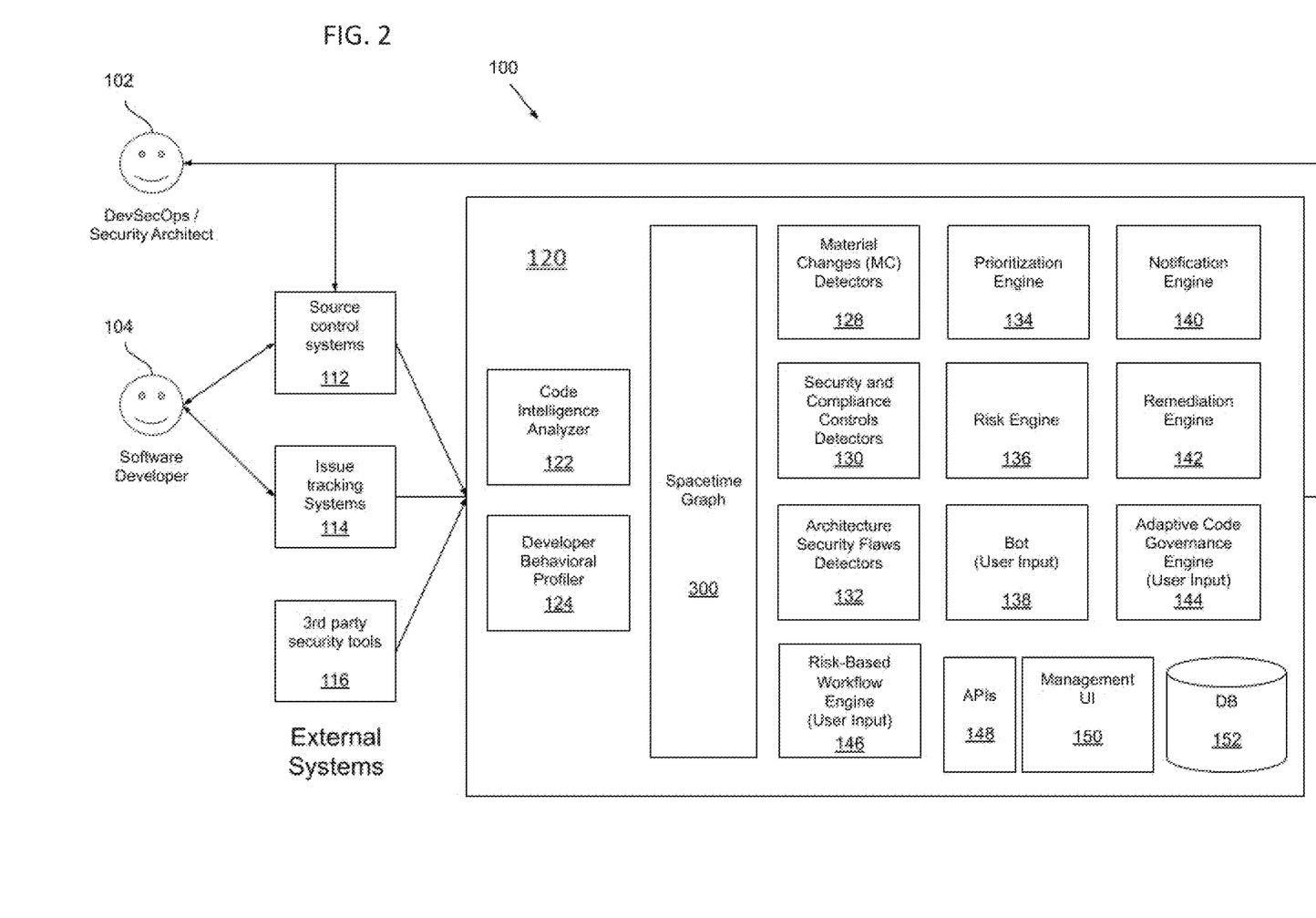
FIG. 2 is a diagram of a high-level system architecture 100 according to the instant innovation.

Referring now to the drawings, FIG. 2 illustrates a high-level system architecture 100 according to the instant innovation. On the left-most side of the diagram are the users. A DevSecOps/Security Architect 102 is the main user of the system. The DevSecOps architect (or comparable user fulfilling the same function) is in charge of the Secure by Design (SbD) and risk assessment processes. The second user is the Software Developer 103, who is the producer of the material changes, and in charge of Remediation.

In the diagram, the column of blocks between the users and the system are external systems. External systems include Source Control Systems 112 (e.g. GitHub, Git, BitBucket etc.), Issue Tracking Systems 114 (e.g. Jira) and 3rd Party Security Tools 116 (e.g. SAST, DAST, IAST, Container Security etc.).

A native system 120 includes various components which are discussed in further details hereafter. The system includes Code Intelligence Analyzers 122 that scan the Spacetime Graph (see below), and add to its edges and vertices a higher level understanding of the application (code importance, security, similarities, APIs, data model, etc.).

A Developer Behavior Profiler 124 builds a behavior profile for each developer based on their code commits and relevant Issue Tickets (expertise, work relationships, review patterns, etc.).

A Spacetime Graph 300 is a multidimensional graph covering the current state of the application and its entire history, as determined by the "Code Intelligence Analyzers" and the "Developer Behavior Profiler 124".

Material Changes Detectors 128 traverse the Spacetime Graph 300 and detect Material Changes to the code. The Material Changes Detectors use AI/machine learning and behavior profiles to identify changes which are material or significant in that they might affect security of the application or infrastructure. Security & Compliance Controls Detectors 130 traverse Spacetime Graph 300 and detect missing or improperly implemented Security & Compliance Controls.

Architecture Security Flaws Detectors 132 traverse the Spacetime Graph 300 and detect complex security flaws, spanning multiple components. A Prioritization Engine 134 produces a simple digest for the Security Architect 102, prioritizing the most important areas to perform a security review on.

A Risk Engine 136 employs machine learning to compute the risk for every material change.

A Bot 138 (User Input) gathers application information from the Software Developers and Security Architect in an automatic and unobtrusive manner, and allows two-way interaction. The system uses Gamification to motivate the developers and architect to improve the system.

A Notification Engine 140 communicates the output of the system to the developers and security architects through email and/or other relevant communication technologies. A Remediation Engine 142 recommends and suggests proper fixes to the developers for remediating the detected issues.

An Adaptive Code Governance Engine 144 manages the adaptive code governance rules of the organization, handling various aspects of security and compliance (e.g. PII, authentication, end-to-end encryption, etc.), instructing the behavior of other engines.

A Risk-Based Workflow Engine 146 allows automation of the input/output of the system. An API 148 allows 3rd party tools to consume data from the spacetime graph 300 through an open API. A Management User Interface (UI) 150 communicates the output of the system, and allows integration for the developers and security architects through a web interface. A Database (DB) 152 stores operational data for the system.

Various terms are used herein for which examples are provided, in order to elucidate the terms. Examples of 'material' (i.e. significant) software changes include, but are in no way limited to: Completely new scenario; Major functionality addition; Usage of new technology; Collecting/storing new sensitive data type; Sharing data with an external entity; Querying data from an external entity; Data flow changes; Usage of new programming languages; Usage of a new OSS library; Expose a new API in existing Endpoint; Adding a new library; Execute new Lambda; Write data to a new DB; Write data to a new S3 bucket; Query data from a new DB; Query data to a new S3 bucket; Calling a new API; Change authentication flow; Change authentication mechanism; Change authorization flow; Change authorization mechanism.

Examples of application risk factors are divided into three types: Technical, Behavioral and Process-related. Examples of technical application risk factors include, but are in no way limited to: Number of Software Material Change; Software Material Change type; Authentication; Authorization; Input validation; Data protection; Information confidentiality; Information integrity; Secure access to a data store; Code churn in relevant code files; Vulnerabilities found by 3rd party tools; Change endpoint from read to write.

Examples of Behavioral application risk factors include, but are not limited to: Number of developers per Software Material Change; Code amount per commit; Number of reviewers; Software Material Change expose to the internet; Software Material Change without Security Control; Software Material Change expose PII to vendor; Developer experience in the project; Time of commit; Time since the start of a feature branch/PR before the merge; Number of reverted commits in relevant code files; New/Inexperienced developer; Number of past security bags per developer; Commit>revert code>commit.

Examples of Process-related application risk factors include, but are not limited to: Pass all security gates; Software Material Change without unit testing.

High-Level Description of the Spacetime Graph

Figure 3:
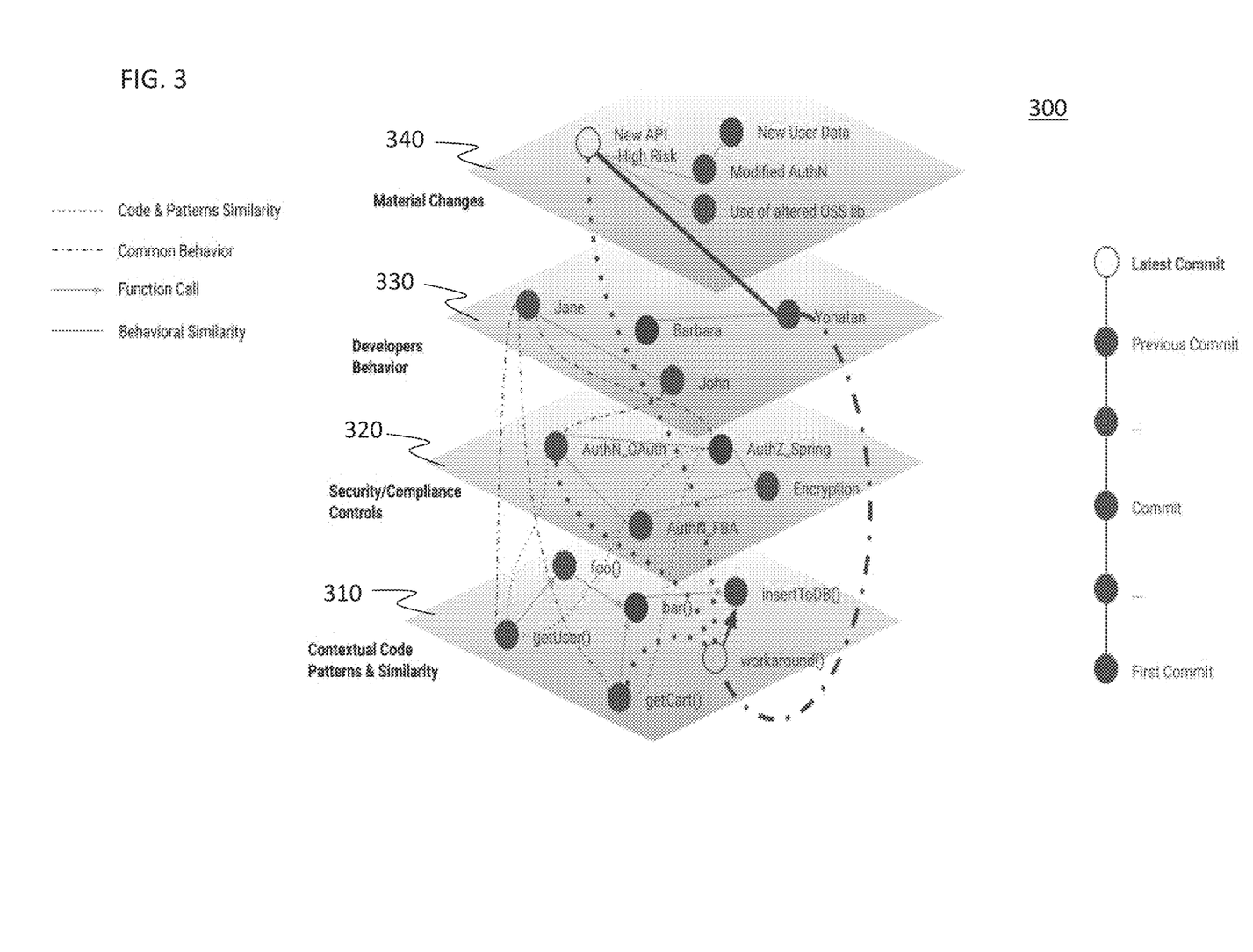
FIG. 3 is a representation of the Spacetime Graph 300.

FIG. 3 is a representation of the Spacetime Graph 300. The Figure includes a key on the left-hand side of the graph. Dotted connectors indicate code and pattern similarities. Dot-dash connectors indicate common behavior. Arrows indicate a function call and solid lines indicate Behavioral Similarities.

Graph 300 is one of the essential features/components of the instant innovation. The graph embodies the innovative concept of looking at a code repository not only from a multidimensional perspective (listed below), but also with a view on the time dimension, that is to say that the spacetime graph also describes all historical states of the application and/or infrastructure, not only a current state of the application and/or infrastructure. Including the time dimension provides an essential understanding of the context of the code and the developers behavior and knowledge, and facilitates combining and/or comparing the findings between other repositories and source control systems in the organization, in order to eventually identify material code changes and prioritize these changes based on risk.

Four dimensions analyzed by the system are:

(1) Contextual Code Patterns, Commonality & Similarity 310—using AI/Machine Learning (supervised and unsupervised) to analyze the source code (application and infrastructure) and to assemble a control-flow graph per repository or across multiple repositories, or even across multiple source control systems, and enrich the graph with proprietary patterns, commonality and Code Fragment similarity insights, for example: Similar functions calls; Similar functions with similar data types; Commonly used 3rd party/security APIs—map the similarities in each repository; Commonly used proprietary APIs—map the similarities in each repository.

(2) Security/Compliance Controls 320—based on the fundamentals of level #1 310, the system contextually identifies security and compliance controls (e.g. NIST, CIS, GDPR, CWE etc.). An example of contextual identification of controls is: Software Developer commits a new API without authentication controls. Is this a mistake? Not necessarily, maybe this API is used for registration, which does not require authentication?

(3) DeveloperBehavior Analysis 330—using AI/Machine Learning (supervised and unsupervised) to analyze all code commits from t=0, comments, profile every developer to understand his/her strengths, his/her development habits, the number of security bugs, working hours, number of code reviewers, the identity of the reviewers, developed testing, using OSS, privately changing OSS, public contributor to OSS etc.

Figure 4:
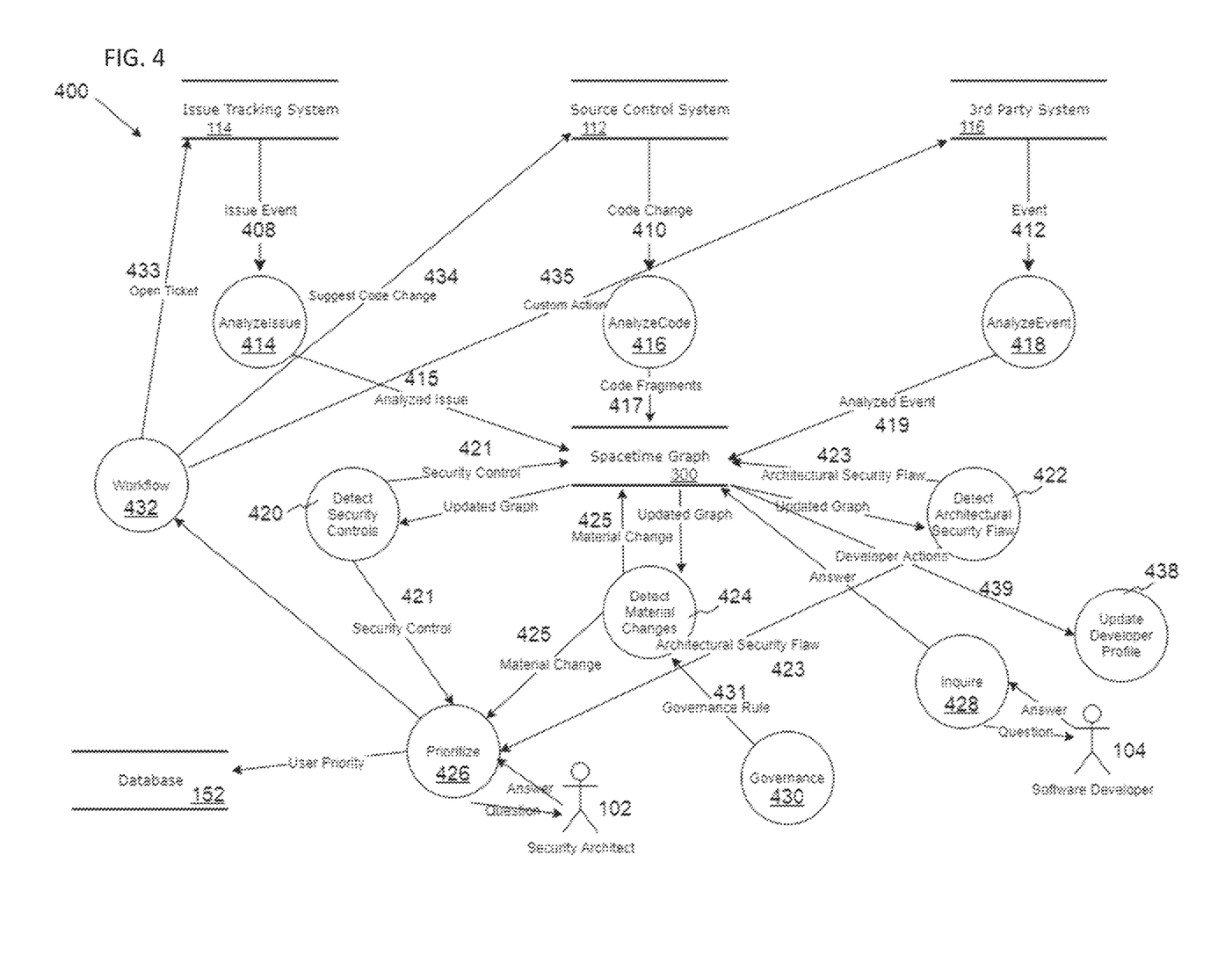
FIG. 4 is a flow diagram 400 of a partial pipeline including a security review.

(4) Material Changes 340—based on the fundamentals of level #1 310—using AI/Machine Learning (supervised and unsupervised) and [developer] behavior analysis to identify changes that might affect the application and/or infrastructure and require another iteration of risk assessment, penetration testing, security review, threat modeling, compliance review. Based on the fundamentals of levels #2 and #3 320, 330—using AI/Machine Learning (supervised and unsupervised) and behavior analysis to calculate the risk of each material software change and prioritize them for the DevSecOps/Security Architect FIG. 4 is a flow diagram 400 of a partial pipeline including a security review. Starting at the top left corner of the diagram, is an Issue Tracking System 114 (see high level architecture diagram FIG. 2) which is a 3rd party system, used to track bugs, features, labels (related to business impact, risk acceptance) etc. in a Software Development Lifecycle (e.g. Atlassian Jira).

At the top middle position is a Source Control System 112 (see FIG. 2) which is a 3rd party system, used to coordinate development of software projects and manage their history in a Software Development Lifecycle (e.g. GitHub).

At the top right position is an exemplary 3rd Party Security Tools 116 (see FIG. 2) which can be any external system that provides input into the system (e.g. SAST, Generic APIs, Risk Systems, Penetration testing tools, etc.).

Issue Tracking System 114 generates an Issue Event 408 which is the creation/modification of an Issue in an Issue Tracking System. The Code Intelligence Analyzer 122 of instant system 120 performs an AnalyzeIssue function 414 which is an analysis of the Issue Event details, the history of its author, and other relevant identities. As a result of the analysis an Analyzed Issue 415 is produced. The Spacetime Graph 300 is updated with the Analyzed Issue 415.

As detailed elsewhere (see "High-Level Description of the Spacetime Graph" section) Spacetime Graph 300 is a graph representation of all relevant data (developers, code, issues, etc.) and the relationships between them, across time. As detailed hereafter (and elsewhere) the system (e.g. Code Intelligence Analyzer 122) scans the real-time and historic code commits and updates the Graph with the distilled data. Furthermore Developer Behavioral Profiler 124 builds behavior profiles for each developer and constantly performs an Update Developer Profile process 438 based on Developer Actions 439 which are also updated to the Spacetime Graph.

Source Control System 112 generates a Code Change 410 which can be any one of a code Commit/Pull Request/Release, representing the author identity and content of a [real-time] code change to a code repository. Code Intelligence Analyzers 122 perform an AnalyzeCode function 416 which includes syntax tree building, AI algorithmic analysis, and historical analysis of all code changes. The result of the analysis is the production of Code Fragments 417. The Spacetime Graph is updated with the Code Fragments (these Code Fragments are placed on the Spacetime Graph and compared with other such Code Fragments—pieces of codes—to determine similarities, patterns etc.).

3rd Party Security Tools 116 issues an Event 412 which comprises contents of some event in a specific time, in terms of the 3rd party security tools system. Code Intelligence Analyzers 122 performs an AnalyzeEvent function 418 which is an analysis of the Event 412, in terms of all affected code, and relevant identities. The result of the analysis is the production of an Analyzed Event 419. The Spacetime Graph 300 is updated with the Analyzed Event 419.

Security & Compliance Controls Detectors 130 perform a Detect Security Controls 420 analysis which is an AI algorithmic analysis of the Spacetime Graph, producing Security Controls 421 (e.g. Authentication, Authorization, Input validation, etc.). The Spacetime Graph is updated with the Security Controls. The Prioritization Engine 134 is also updated with the Security Controls 421.

Architecture Security Flaws Detectors 132 perform a Detect Architectural Security Flaw analysis 422 which is an AI algorithmic analysis of the Spacetime Graph, producing Architectural Security Flaws 423 (e.g. missing validation of JWT token). The Spacetime Graph is updated with the Architectural Security Flaw 423. The Prioritization Engine 134 is also updated with the Architectural Security Flaw 423.

Material Changes Detectors 128 perform a Detect Material Changes operation 424 to detect those changes that are "material" or significant to the user, out of all code (i.e. historic and real-time code commits), as well as other changes coming from the Issue Tracking Systems, Source Control Systems, and other 3rd Party Systems. The Spacetime Graph is updated with detected Material Changes 425. The Prioritization Engine 134 is also updated with the Material Changes 425.

The Risk Engine 136 calculates a risk for each of the material changes. The risk is calculated based on identification of at least one of Technical, Behavioral and Process-related risk factors, which are discussed elsewhere. The Prioritization Engine receives the risk assessment for each of the material changes.

As mentioned, the Prioritization Engine 134 is updated with all the Security Controls 421, Architectural Security Flaw(s) 423 and Material Changes 425 and effects a Prioritize operation 426 in order to present all detections, and proposed actions in a priority based order to the Security Architect 102, e.g. in the form of a simple digest.

Database 152 is used for persistent data storage and updated with the user priority data produced by the Prioritization Engine. Based on the Spacetime Graph, the Security Architect is able to perform an optimized, streamlined Inquire operation 428 of asking the Software Developers 104 concise and minimal questions, to fill in missing data.

The Bot 138 handles the Question/Answer interaction between the system and the Security Architect as well as between the system and the Software Developers.

The Notification Engine 140 handles delivery of analysis summary to the user of native system, using common mechanisms like instant messaging, and other communication systems.

The Remediation Engine 142 compiles code change suggestions, to be used by the Developer.

The Adaptive Code Governance Engine 144 performs a Governance process 430 resulting in the issue of a Governance rule 431 which includes adaptive code governance rules that dictate which changes are material, and what is the risk attributed to them (determined by the Risk Engine 136), in relation to the user's organization process.

The Risk-Based Workflow Engine 146 triggers a Workflow 432. Based on the Adaptive Code Governance Rule 430, triggered by a Material Change 425, a specific workflow is triggered, creating a ticket 433 in the Issue Tracking System 114, or suggesting a code change 434 via a pull request in a Source Control System 112. Alternatively or additionally, the workflow creates a Custom Action 435 relevant to one or more of the 3rd Party Systems 116 (e.g. Block Route Event in an API Gateway, Initiate Vulnerability Scanning Event, Initiate Automatic Penetration Testing Event).

Exemplary Use Case

In the following exemplary use case Personal Identifiable Information (PII) is exposed in an API without authorization.

BRIEF DESCRIPTION

1. An API is added/changed by a developer to the Source Control System 112.
2. A new PII field is exposed in the API by the developer.
3. Spacetime Graph updated after the Code Commit, which is analyzed by the Code Intelligence Analyzer 122. The Spacetime Graph is updated with Code Fragments describing the Code Change.
4. Spacetime Graph updated by Analyzed Issue related to the aforementioned code change.
5. Field detected as PII.
6. Change identified as a Material Change, e.g. as determined by the Governance Rule (possibly as defined by the User/Owner).
7. Prioritization Engine prioritizes what material changes the Security Architect should preferably review, based on the type of change the assessed risk.
8. Security Architect conducts a security process (e.g. penetration testing, security review, compliance review, Lightweight Threat Modeling, etc), in this case a Lightweight Threat Model.

DETAILED DESCRIPTION

1. API GetUserDetails is added. The system checks through an integration with the production API Gateway if it is properly authorized, which, as it turns out, it is not.
2. A software developer changes a Data Model Java class called UserDetails (which is exposed to the internet by the API GetUserDetails without authorization), adding a SocialSecurityNumber field to it.
3. All details from the Commit are consumed into the Spacetime graph—The software developer's details, the code changes, time, code comments, pull request comments, commit comments, etc.
4. All details from the relevant Issue are consumed into the Spacetime graph—project details, developer discussions etc.
5. SocialSecurityNumber is detected as PII, using all data in the Spacetime graph, analyzed by AI. (This is an example of implementing the knowledge of the AI/Machine Learning/behavior analysis gleaned from comparing patterns, similarities, developer profiles, etc. within the code repository and across various repositories and all 3rd party systems that the system platform has access to.)
6. Combining all that is known about the PII field, and the fact that it is now exposed in an API to the internet without authorization, makes the change a Material Change.
7. Given the large volume of code changes in the organization, the Security Architect focuses only on Material Changes when choosing what to work on. The Prioritization engine prioritizes the Material Changes based on each respective risk level as determined by the Risk Engine.
8. Following the prioritization, the Security Architect conducts a Security Review. In this case the chosen review is a Lightweight Threat Model, focusing on the relevant Material Change as an agenda, with the relevant parties, including the software developer that added the field.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A system for risk assessment of an application or infrastructure, comprising:
   Code Intelligence Analyzers that scan historic code commits in code repositories of the application or infrastructure as well as real-time code commits;
   a Developer Behavior Profiler builds a behavior profile for each developer of the application, based, at least on said historic and real-time code commits and relevant issues in Issue Tracking Systems; and
   a Spacetime Graph, being a multidimensional graph detailing a current state of the application or infrastructure and a history of said code commits of the application or infrastructure, as determined by said Code Intelligence Analyzers and said Developer Behavior Profiler, wherein said spacetime graph is multidimensional and includes at least:
   (a) a Contextual Code Patterns dimension, including insights as to patterns, commonalities and similarities within said repository and between said repository and other repositories resulting from AI or Machine Learning analysis of said code commits and assembly of a control-flow graph for at least said code repository,
   (b) a Security and Compliance Controls dimension, including contextually identified security and compliance controls,
   (c) a Developer Behavior Analysis dimension, including said behavior profiles of said developers, and
   (d) a Material Changes dimension including changes that might affect the application or infrastructure.

2. The system of claim 1, further comprising:
   Material Changes Detectors configured to detect material changes in said historic and real-time code commits of the application or infrastructure using artificial intelligence (AI) or machine learning and said behavior profiles to identify said material changes that might affect security and compliance posture of the application or infrastructure.

3. The system of claim 2, further comprising:
   a Risk Engine configured to calculate a risk for each of said material changes, said risk calculated based on identification of at least one of Technical, Behavioral and Process-related risk factors.

4. The system of claim 3, further comprising:
   a Prioritization Engine configured to prioritize for use by a security architect, said material changes based on said calculated risk.

5. The system of claim 4, further comprising:
an Adaptive Code Governance Engine configured to issue a Governance rule including adaptive code governance rules that dictate which detected changes are said material changes, and what said risk is attributed to said material changes.

6. The system of claim 5, further comprising a Risk-Based Workflow Engine configured to trigger a specific workflow as a result of said adaptive code governance rule being issued, said specific workflow includes at least one of creating a ticket in an external issue-tracking system and suggesting a code change in a Source Control System.

7. The method of claim 1, wherein said spacetime graph also describes all historical states of the application or infrastructure.

8. The method of claim 1, wherein said Contextual Code Patterns dimension further includes a control-flow graph across multiple source control systems.

9. A method for risk assessment of an application or infrastructure, comprising:
scanning historic code commits in code repositories of the application or infrastructure as well as real-time code commits using Code Intelligence Analyzers;
building behavior profiles for each developer based on at least said scanning of said historic and real-time code commits; and
generating a spacetime graph detailing a current state of the application or infrastructure and a history of said code commits of the application or infrastructure based on said scanning and said behavior profiles, wherein said spacetime graph is multidimensional and includes at least:
(a) a Contextual Code Patterns dimension, including insights as to patterns, commonalities and similarities within said repository and between said repository and other repositories resulting from AI or Machine Learning analysis of said code commits and assembly of a control-flow graph for at least said code repository,
(b) a Security and Compliance Controls dimension, including contextually identified security and compliance controls,
(c) a Developer Behavior Analysis dimension, including said behavior profiles of said developers, and
(d) a Material Changes dimension including changes that might affect the application or infrastructure.

10. The method of 9, further comprising:
detecting material changes in said historic and real-time code commits of the application or infrastructure using artificial intelligence (AI) or machine learning and said behavior profiles to identify said material changes that might affect security of the application or infrastructure.

11. The method of claim 10, further comprising:
calculating a risk for each of said material changes, said risk calculated based on identification of at least one of Technical, Behavioral and Process-related risk factors.

12. The method of claim 11, further comprising:
prioritizing, for use by a security architect, said material changes based on said calculated risk.

13. The method of claim 12, further comprising:
issuing a Governance rule including adaptive code governance rules that dictate which detected changes are said material changes, and what said risk is attributed to said material changes.

14. The method of claim 13, further comprising
triggering a specific workflow as a result of said adaptive code governance rule being issued, said specific workflow includes at least one of creating a ticket in an external issue-tracking system and suggesting a code change in a Source Control System.

15. The method of claim 9, wherein said spacetime graph also describes all historical states of the application or infrastructure.

16. The method of claim 9, wherein said Contextual Code Patterns dimension further includes a control-flow graph across multiple source control systems.

* * * * *